US012700724B2

(12) United States Patent
Vastmans et al.

(10) Patent No.: US 12,700,724 B2
(45) Date of Patent: Aug. 4, 2026

(54) ADAPTIVE RIGID SEA JOINT KIT

(71) Applicant: NKT HV Cables AB, Lyckeby (SE)

(72) Inventors: Jakub Vastmans, Cologne (DE); Karl-Magnus Gustavsson, Ronneby (SE); Björn Zettervall, Nättraby (SE); Patrik Holmberg, Ronneby (SE); Isabella Corso, Stenkullen (SE)

(73) Assignee: NKT HV Cables AB, Lyckeby (SE)

( * ) Notice: Subject to any disclaimer, the term of this patent is extended or adjusted under 35 U.S.C. 154(b) by 309 days.

(21) Appl. No.: 18/628,938

(22) Filed: Apr. 8, 2024

(65) Prior Publication Data

US 2024/0356325 A1      Oct. 24, 2024

(30) Foreign Application Priority Data

Apr. 21, 2023   (EP) ..................................... 23169262

(51) Int. Cl.
*H02G 15/00* (2006.01)
*G02B 6/44* (2006.01)
(Continued)

(52) U.S. Cl.
CPC ........... *H02G 15/08* (2013.01); *G02B 6/4454* (2013.01); *H01B 7/2825* (2013.01); *H01B 7/14* (2013.01)

(58) Field of Classification Search
CPC .......... H02G 15/10; H02G 1/14; H02G 15/14; H02G 15/1806; H02G 15/188;
(Continued)

(56) References Cited

U.S. PATENT DOCUMENTS 3,656,084 A      4/1972   Malia
3,691,291 A      9/1972   Taj
(Continued)

FOREIGN PATENT DOCUMENTS

CN           201122192 Y      9/2008
CN           104600656 B     12/2017
(Continued)

OTHER PUBLICATIONS

Extended European Search Report; Application No. 23169262.5; Completed: Oct. 6, 2023; Mailing Date: Oct. 16, 2023; 11 Pages.

*Primary Examiner* — Pete T Lee
(74) *Attorney, Agent, or Firm* — Whitmyer IP Group LLC

(57)      ABSTRACT

Adaptive rigid sea joint kit for jointing submarine power cables, wherein the adaptive rigid sea joint kit includes: A2) an inner watertight casing kit, A4) a rigid outer mechanical casing kit, wherein each of the kits A2 and A4 includes at least one base component, which can be fitted with a plurality of types and/or sizes of submarine power cables, and wherein each of the kits A2 and A4 includes one set of an adaptive component or a plurality of sets of a respective adaptive component, each set of an adaptive component including a plurality of members of different designs and/or sizes of the adaptive component, enabling the at least one base component of the same kit to fit with different sizes and/or designs of submarine power cables, wherein the adaptive rigid sea joint kit thereby enables building part of one of any of a plurality of differently sized and/or designed rigid sea joints from the kits A2 and A4 for jointing different types of submarine power cables falling within an applicability range of the adaptive rigid sea joint kit.

20 Claims, 2 Drawing Sheets

(51) Int. Cl.
  *H01B 7/282* (2006.01)
  *H02G 15/08* (2006.01)
  *H01B 7/14* (2006.01)

(58) Field of Classification Search
  CPC ...... H02G 15/24; H02G 15/103; H02G 15/18;
  H02G 15/184; H02G 15/08; H02G
  15/113; H02G 15/115; H02G 15/182;
  H02G 15/105; H02G 15/196; H02G
  15/085; H02G 1/1273; H02G 15/013;
  H02G 15/04; H02G 15/06; H02G 15/117;
  H02G 15/1826; H02G 9/02; H02G 9/025;
  H02G 9/06
  See application file for complete search history.

(56) References Cited

U.S. PATENT DOCUMENTS

| | | | |
|---|---|---|---|
| 4,006,288 A | | 2/1977 | Stevens |
| 4,504,695 A | * | 3/1985 | Fontaine ................ H02G 15/14 |
| | | | 174/21 R |
| 2002/0168231 A1 | * | 11/2002 | Hayakawa ............. H02G 15/14 |
| | | | 405/160 |
| 2016/0091684 A1 | | 3/2016 | Van Cauteren et al. |
| 2022/0130575 A1 | * | 4/2022 | Chae .................... H02G 15/196 |

FOREIGN PATENT DOCUMENTS

| | | | |
|---|---|---|---|
| EP | 4148925 A1 | 3/2023 | |
| WO | 2016192778 A1 | 12/2016 | |

* cited by examiner

Picking

Picking

ADAPTIVE RIGID SEA JOINT KIT

TECHNICAL FIELD

The present disclosure generally relates to rigid sea joints for submarine power cables.

BACKGROUND

Currently, submarine power cable owners/operators have to stockspare parts in case of a repair. This typically means at least three joints and at least a few hundred meters of spare cable per submarine power cable system, i.e., per each installed submarine power cable extending between an offshore power generation source or offshore power consumer and a joint at landfall, or between two landfalls. For large operators that own many different submarine power cable systems, such as 10 systems, this implies the need of very many similar but not identical joints. In the example with 10 systems, 30 joints would be needed: three for each of the 10 systems.

Given that submarine power cable repairs are rare for an individual system, this means that a lot of capital is tied up long-term in this stock and managing the stock itself is costly and cumbersome as it requires space and labour to perform inspections. Furthermore, some of the parts in stock expire and need to be replaced on a periodic basis, creating additional costs, unnecessary waste, and quality risks in case of failure to replace expired parts in time. The advantage of this dedicated spare parts approach is that the joints used during repair are fully type-tested and right-sized for the specific cable system. However, the significance of this advantage declines as more and more systems move past their warranty periods.

SUMMARY

A general object of the present disclosure is to provide an adaptive rigid sea joint kit for jointing submarine power cables which solves or at least mitigates problems of the prior art.

There is hence according to a first aspect of the present disclosure provided an adaptive rigid sea joint kit for jointing submarine power cables, wherein the adaptive rigid sea joint kit comprises: A2) an inner watertight casing kit, A4) a rigid outer mechanical casing kit, wherein each of the kits A2 and A4) comprises at least one base component, which can be fitted with a plurality of types and/or sizes of submarine power cables, and wherein each of the kits A2 and A4 comprises one set of an adaptive component or a plurality of sets of a respective adaptive component, each set of an adaptive component comprising a plurality of members of different designs and/or sizes of the adaptive component, enabling the at least one base component of the same kit to fit with different sizes and/or designs of submarine power cables, wherein the adaptive rigid sea joint kit thereby enables building part of one of any of a plurality of differently sized and/or designed rigid sea joints from the kits A2 and A4 for jointing different types of submarine power cables falling within an applicability range of the adaptive rigid sea joint kit.

The base components can be used across different submarine power cable systems and even different cable manufacturers. Base components can be used with any submarine power cable within a broad range of parameters using selected adaptive components. As a result, only a few base components with selected adaptive components are needed to cover a broad range of submarine power cables e.g., to be repaired. Thus, owners/operators will only need to stock a few base components augmented with adaptive components to cover all their submarine power cable systems.

The base components are identical for each rigid sea joint irrespective of the design of the submarine power cable, within the acceptability range of the adaptive rigid sea joint kit, allowing for only few of them to be put in stock. For example, three sets of base components if one or fewer repairs per year are expected by the cable operator or 5-6 if up to two repairs can be expected by the operator in a year. All adaptive components can be selected and stocked based on the submarine power cable systems of the operator, but their share in value of the complete rigid sea joint is far smaller than that of the base components implying a considerable reduction in the capital tied-up in stock of the operator.

The acceptability range is the range of submarine power cable designs that the adaptive rigid sea joint kit can be used with to make a suitable rigid sea joint. The acceptability range may for example be set by a range A mm to B mm of outer diameters of a core of a submarine power cable, insulation system materials, and/or conductor size, materials and/or designs.

The adaptive rigid sea joint kit may be used as a repair kit during repair operations of a submarine power cable. Alternatively, it may be used to make a joint for jointing two submarine power cables offshore during cable laying of a new submarine power cable system.

The adaptive rigid sea joint kit may be configured to be used with high voltage (HV) submarine power cables. The HV submarine power cables may be HVAC submariner power cables or HVDC submarine power cables.

One embodiment comprises A1) an electric joint kit, wherein the kit A1 comprises at least one base component which can be fitted with a plurality of types and/or sizes of submarine power cables, and a plurality of sets of a respective adaptive component, each set of an adaptive component comprising a plurality of members of different designs and/or sizes of the adaptive component, enabling the at least one base component of the kit A1 to fit with different sizes and/or designs of submarine power cables, wherein the adaptive rigid sea joint kit thereby enables building one of any of a plurality of differently sized and/or designed rigid sea joints from the kits A1, A2 and A4 for jointing different types of submarine power cables falling within the applicability range of the adaptive rigid sea joint kit.

The adaptive rigid sea joint kit for jointing submarine power cables may be designed for jointing single core submarine power cables, or multi-core submarine power cables. A multi-core submarine power cable may for example be a 3-phase submarine power cable. In case the adaptive rigid sea joint kit is designed for jointing two multi-core submarine power cables, the adaptive rigid sea joint kit comprises one kit A1 and one kit A2 for each electrical core and optionally one kit A3 for each fibre optic cable of the multi-core submarine power cables. The kit A4 is in this case common to all the cores and all integrated fibre optic cables.

The adaptive rigid sea joint kit provides for jointing two submarine power cables that are identical in design and/or diameter or different in design and/or diameter, for example having different conductor cross-section and/or core dimensions and/or armouring material.

One embodiment comprises A1) an electric joint kit, wherein the kit A1 comprises a plurality of sets of a respective adaptive component, each set of an adaptive component comprising a plurality of members of different designs and/or sizes of the adaptive component, enabling members of the sets of the kit A1 to be assembled with each other to fit with different sizes and/or designs of submarine power cables, wherein the adaptive rigid sea joint kit thereby enables building one of any of a plurality of differently sized and/or designed rigid sea joints from the kits A1, A2 and A4 for jointing different types of submarine power cables falling within the applicability range of the adaptive rigid sea joint kit. In this example, the electric joint kit does not have any base member; instead the electric joint is made from adaptive parts only, selected from the sets of an adaptive component to fit the submarine power cables to be jointed. One of the sets of adaptive components may for example comprise plurality of main joint sleeves with different designs/sizes, and one or more of the following: a set of adapters of different inner diameters, a set of connectors of different sizes and/or design and/or materials, a set of fixing rings of different inner diameters and/or designs, and a set of contact sleeves of different sizes and/or designs.

According to one embodiment the electrical joint kit comprises a base component in the form of a main joint sleeve.

According to one embodiment the electrical joint kit comprises four sets of adaptive components: a set of adapters of different inner diameters, a set of connectors of different sizes and/or design and/or materials, a set of fixing rings of different inner diameters and/or designs, and a set of contact sleeves of different sizes and/or designs.

According to one embodiment each adapter is configured to be arranged inside the main joint sleeve, each connector is configured to connect conductors of a respective core, one each from two submarine power cables, each fixing ring is configured to be attached to an adapter and to an insulation layer of a core of a submarine power cable, and each contact sleeve is configured to be arranged radially outside the connector, connected to two fixing rings.

According to one embodiment the inner watertight casing kit comprises a base component in the form of an inner watertight casing configured to accommodate components of the electrical joint kit assembled to make an electric joint of a pair of cores, one each from two submarine power cables.

According to one embodiment the inner watertight casing kit comprises a set of an adaptive component in the form of cones of different inner diameters and/or designs, each cone being configured to be attached to the inner watertight casing in a watertight manner and to enable attaching a metallic water blocking layer of a core of a submarine power cable to the cone in a watertight manner.

According to one embodiment at least some of the cones are solder cones for soldering the metallic water blocking layer to the cone.

The set of an adaptive components may comprise reducer couplings having a conical or frustoconical section. The reducer couplings may have a cylindrical portion which transitions to the conical or frustoconical portion. The reducer couplings may have different inner diameters and/or designs, each reducer coupling being configured to be attached to the inner watertight casing in a watertight manner to enable attaching a metallic water blocking layer of a core of a submarine power cable to the reducer coupling in a watertight manner.

According to one embodiment at least some of the reducer couplings are configured for soldering the metallic water blocking layer to the reducercoupling.

One embodiment comprises A3) a fibre optics joint kit, wherein the kit A3 comprises at least one base component which can be fitted with a plurality of types and/or sizes of submarine power cables, and a plurality of sets of a respective adaptive component, each set of an adaptive component comprising a plurality of members of different designs and/or sizes of the adaptive component, enabling the at least one base component of the kit A3 to fit with different sizes and/or designs of submarine power cables, wherein the adaptive rigid sea joint kit thereby enables building part of one of any of the plurality of differently sized and/or designed rigid sea joints from the kits A2, A3, and A4 for jointing different types of submarine power cables falling within the applicability range of the adaptive rigid sea joint kit.

The adaptive rigid sea joint kit may comprise more than one fibre optics joint kit, for example two, or three fibre optics joint kits, each for jointing a respective pair of fibre optic cables.

The at least one base component of the fibre optics joint kit is configured to be fitted with a plurality of types and/or sizes of fibre opticscables.

One example comprises A3) a fibre optics joint kit, wherein the kit A3 comprises at least one base component which can be fitted with a plurality of types and/or sizes of fibre optic cables, and a plurality of sets of a respective adaptive component, each set of an adaptive component comprising a plurality of members of different designs and/or sizes of the adaptive component, enabling the at least one base component of the kit A3 to fit with different sizes and/or designs of fibre optic cables.

According to one embodiment the fibre optics joint kit comprises two base components: a splice cassette, and a compression cassette configured to accommodate the splice cassette.

According to one embodiment the fibre optics joint kit comprises two sets of adaptive components: 1) inner and outer cable glands providing sealing with different inner diameters and/or for different fibre optic cable designs, and/or a potting compound for providing sealing between the compression cassette and fibre optic cables with different diameters, 2) an electrical connection kit comprising clamps of different sizes configured to be connected to a metallic tube of a fibre optic cable for providing an electrical connection between metallic tubes of two fibre optic cables, and cable lugs configured to be connected to armour of a fibre optic cable for providing an electrical connection between the armour of two fibre optic cables.

The fibre optics joint kit provides for the possibility to reliably seal a large range of fibre optic cable diameters by using versatile inner and outer cable glands. The inner cable glands and/or the outer cable glands may have a peelable inner sealing structure, where the sealing structure can be selectively peeled off in layers to fit a certain fibre optic cable diameter.

The electrical connection kit may comprise a busbar and/or an earthing wire to which the clamps and/or cable lugs may be connected for electrical connection between the clamps and/or cable lugs and thus between fibre optic cables that are spliced. Alternatively, the busbar or earthing wire may be a base component of the fibre optics joint kit.

The flexibility of the earthing design ensures that standard 10 mm fibre optic cables, armoured fibre optic cables or slotted-core fibre optic cables, which can often be found in existing submarine power cables, can be spliced without the need to re-engineer the joint machine or exchange parts.

According to one embodiment the rigid outer mechanical casing kit comprises a first base component in the form of a rigid outer mechanical casing configured to accommodate elements of the inner watertight casing kit assembled to make a watertight cover around an electric joint of a core of a submarine power cable and a fibre optic joint assembled from the fibre optics joint kit.

According to one embodiment the rigid outer mechanical casing kit further comprises a second base component in the form of bend restrictors and/or bend stiffeners configured to be connected at axial ends of the rigid outer mechanical casing.

According to one embodiment the rigid outer mechanical casing kit comprises a first set of adaptive components in the form of armour fixation flanges in different sizes and/or designs, configured to be connected to the rigid outer mechanical casing and to armour of a submarine power cable.

According to one embodiment the armour fixation flanges are welding flanges or clamping flanges.

According to one embodiment the rigid outer mechanical casing kit comprises a second set of adaptive components in the form of subsets of elongated armour elements of different materials, and a third set of adaptive components in the form of extra armour plates, each extra armour plate being configured to be arranged around armour of a submarine power cable at an axial distance from an end of the rigid outer mechanical casing, for attaching the armour elements to the extra armour plate.

The rigid outer mechanical casing with exchangeable armour fixation flanges and optional second and third set of adaptive components ensures that no part of the rigid sea joint needs to be re-designed for individual submarine power cables yet still a broad range of submarine power cables can be covered with a minimal number of adaptive components.

There is according to a second aspect of the present disclosure provided a method of selecting components for a rigid sea joint for jointing two submarine power cables, using the adaptive rigid sea joint kit as claimed in any of the preceding claims, the method comprising: picking one of each type of base component of each kit A1-A4), and picking adaptive components from the sets of adaptive components from each kit A1-A4) that fit the size and design of the two submarine power cables.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly statedotherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
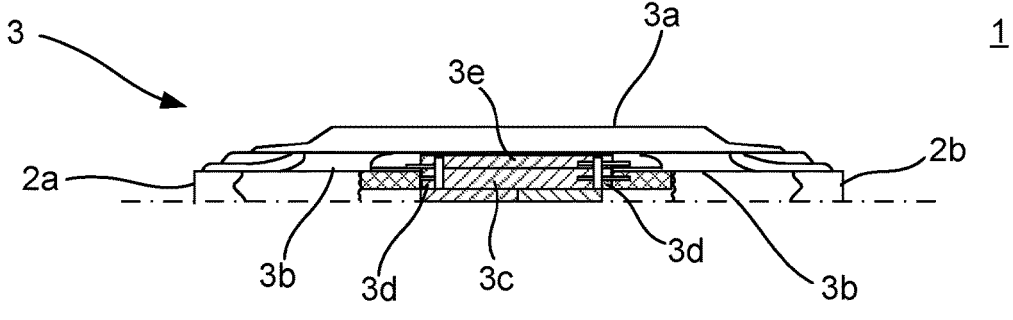
FIG. 1 schematically shows an example of an adaptive rigid sea joint kit.
Figure 1:
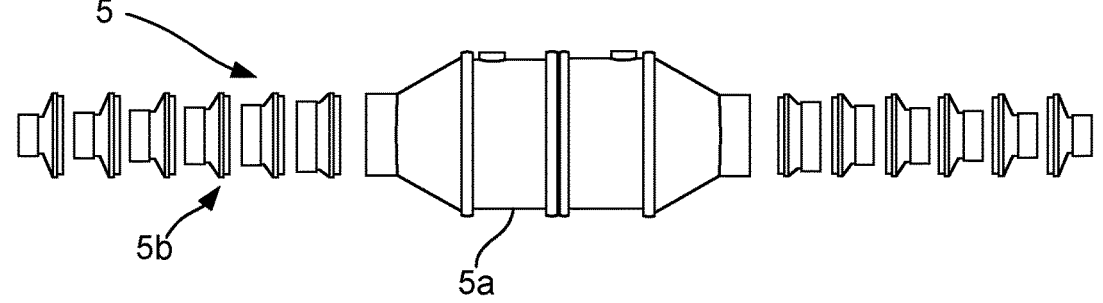
Figure 1:
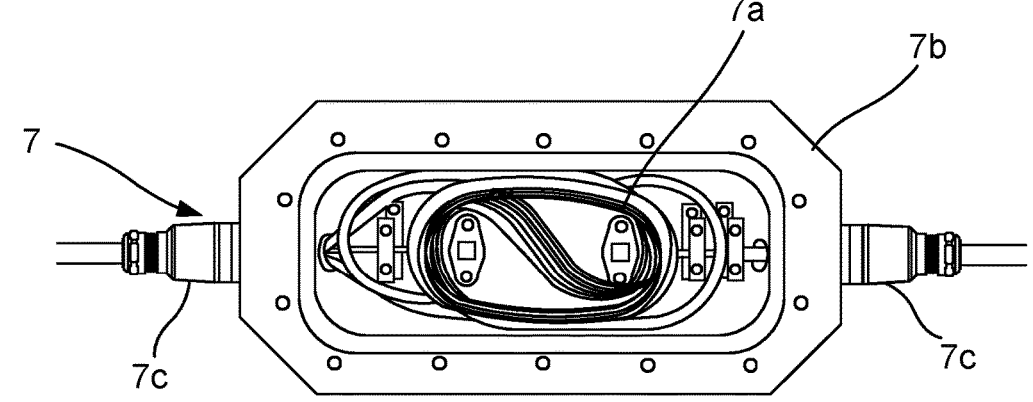
Figure 1:
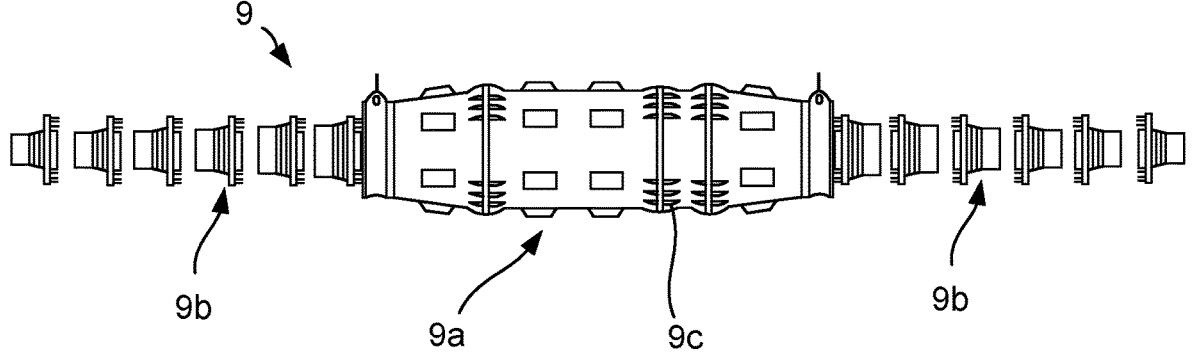

FIG. 1 shows an example of an adaptive rigid sea joint kit 1. The adaptive rigid sea joint kit 1 allows for making a tailored rigid sea joint 11 jointing two submarine power cables 17a and 17b (both shown in FIG. 3) with a wide range of different sizes and/or designs.

The adaptive rigid sea joint kit 1 may be used for jointing single-core submarine power cables or multi-core submarine power cables. In general, a submarine power cable comprises one or more cores, wherein each core comprises a conductor, an insulation system arranged around the conductor, the insulation system including an inner semiconducting layer, an insulating layer, and an outer semiconducting layer. Each core may also comprise a metallic water blocking layer, for example comprising lead, copper, a copper alloy, aluminium, or stainless steel, and a polymeric sheath arranged around the insulation system, and around the metallic water blocking layer, if present. In case a submarine power cable comprises more than one core, the cores may be arranged in a stranded configuration. In this case, typically the submarine power cable may also comprise filler profiles, each being arranged between respective adjacent pairs of cores. Additionally, the submarine power cable may comprise one or more armour layers arranged around the one or more cores. Each armour layer comprises armour elements such as armour wires e.g., comprising galvanized steel, stainless-steel, and/or a polymeric material. The submarine power cable also comprises an outer sheath or outer serving which forms the outermost layer of the submarine power cable. The submarine power cable may also comprise one or more optical fibre cables. The optical fibre cable(s) may be arranged in one of the armour layers, replacing one or more armour wires, or it/they may be arranged in the filler profile(s). In addition to the structure described above, submarine power cables may comprise other layers too, such as one or more of: a conductor tape layer, swelling tape layers(s), a bedding layer underneath each armour layer, and bitumen which has been flushed onto the armour wires during the armour stranding process in the factory.

The adaptive rigid sea joint kit 1 may be adapted for jointing HVAC or HVDC submarine power cables. Any base component and adaptive components may be specifically adapted to the particular application, i.e., AC or DC application.

The adaptive rigid sea joint kit 1 comprises one or more electrical joint kit(s) 3, one or more inner watertight casing kit(s) 5, one or more fibre optics joint kit(s) 7, and a rigid outer mechanical casing kit 9.

Each inner watertight casing kit 5, fibre optics joint kit 7, and the rigid outer mechanical casing kit 9 comprises one or more base components. Each base component can be used with a wide range of different submarine power cables 17*a* and 17*b*.

Each electrical joint kit 3 may according to some examples also comprise a base component.

Further, each electrical joint kit 3, each inner watertight casing kit 5, each fibre optics joint kit 7, and the rigid outer mechanical casing kit 9 comprises one or more sets of adaptive components. Each set of adaptive components concerns a specific type of adaptive component and comprises a plurality of members of different designs and/or sizes of the adaptive component. Each adaptive component is adapted to be used with the corresponding base component(s) of the same kit 3, 5, 7, or 9, and is an interface that enables use of the base component(s) with the wide range of different submarine power cables. Thus, based on the designs/sizes of specific submarine power cables to be joined within the wide range of submarine power cable designs/sizes, adaptive components can be selected from the kits 3, 5, 7, and 9 and used with the base components to build a tailored rigid sea joint for the submarine power cables in question.

In FIG. 1 some components of an electrical joint kit 3 are shown in an assembled state with a respective core 2*a* and 2*b* of two submarine power cables, forming an electric joint. Thus, specific adaptive components from sets of adaptive components of the electrical joint kit 3 have been selected based on the sizes and designs of the two cores 2*a* and 2*b* that are joined.

In examples in which each electric joint kit 3 comprises a base component, the base component is a main joint sleeve 3*a*. The main joint sleeve 3*a* has a large size that fits many different sizes and designs of cores 2*a*, 2*b* of a submarine power cable. The main joint sleeve 3*a* may be used with submarine power cables with different types of extruded insulation systems, for example with an insulation layer comprising cross-linked polyethylene (XLPE), ethylene propylene rubber (EPR), or a thermoplastic polymer such as polypropylene (PP). The main joint sleeve 3*a* is made of a polymeric material such as silicone or ethylene propylene diene monomer (EPDM) rubber. The main joint sleeve 3*a* is a pre-moulded body. The main joint sleeve 3*a* may have an integrated stress control system.

In an installed state, the main joint sleeve 3*a* is centred over the conductor joint and extends axially over the conductor joint and around a portion of each of the two cores 2*a*, 2*b* that are jointed.

Each electrical joint kit 3 comprises a plurality of sets of adaptive components. One of the sets of adaptive components is a set of adapters 3*b*, i.e., the adapters 3*b* are the members of this set. Each adapter 3*b* comprises a polymeric material, such as silicone. Each adapter 3*b* of the set is configured to be placed inside the main joint sleeve 3*a* over and in contact with the insulation system of a submarine power cable and with the inner surface of the main joint sleeve 3*a*. Each electric joint comprises two adapters 3*b*, one between each core and the main joint sleeve 3*a*. The adapters 3*b* may have different inner diameter but have the same outer diameter, which essentially corresponds to the inner diameter of the main joint sleeve 3*a*, for assembling the main joint sleeve 3*a* with submarine power cables with different core diameters.

Each electrical joint kit 3 comprises a set of connectors 3*c* of different sizes, designs, and/or materials. The connectors 3*c* are typically made of metal such as aluminium or a copper alloy. The connectors 3*c* are configured to receive, fixate, and electrically connect the conductors of the two submarine power cables to be joined, to thus form a conductor joint. The connectors 3*c* in the set may have different inner diameter to accommodate different conductor sizes and/or different designs depending on the conductor design. For example, one or more of the connectors 3*c* in the electrical joint kit 3 may have a stepped inner diameter design for use with profile wire conductors or different diameters on either end to create transitions between two conductors of different diameters and/or materials.

Each electrical joint kit 3 comprises a set of fixing rings 3*d* of different inner diameters and/or designs. The fixing rings 3*d* are configured to be arranged around a connector 3*c*. Some fixing rings 3*d* may for example be bi-parted, i.e., made of two halves, or be formed as a single annular ring.

Each electric joint kit 3 comprises a set of contact sleeves 3*e* of different sizes and/or designs. The contact sleeves 3*e* may for example be made of metal such as aluminium, or copper or a copper alloy. The contact sleeves 3*e* may for example be designed to accommodate different diameters and/or axial lengths of the connectors 3*c*.

Each contact sleeve 3*e* is configured to be arranged around a connector 3*c* and two fixing rings 3*d*. Each fixing ring 3*d* is configured to be screwed into the insulation layer of a respective submarine power cable to be joined and into an adapter 3*b*. Each contact sleeve 3*e* may have two inner grooves, each configured to receive a portion of a respective fixing ring 3*d*.

Each inner watertight casing kit 5 comprises a base component in the form of an inner watertight casing 5*a*. The inner watertight casing 5*a* may comprise two parts that are mounted together, for example by welding. The inner watertight casing 5*a* is made of metal, such as stainless steel. There is only one size of the inner watertight casing 5*a* in the inner watertight casing kit 5. The inner watertight casing 5*a* is configured to accommodate components of the electrical joint kit 3 assembled to make an electric joint of two cores, one each from the two submarine power cables to be jointed. The inner watertight casing 5*a* has two openings, one at each axial end, for receiving a respective core of a submarine power cable. The openings are large enough to be able to receive a core of any submarine power cable within the wide range of submarine power cables that the adaptive rigid sea joint kit 1 can be used with.

Each inner watertight casing kit 5 comprises a set of an adaptive component in the form of a cone or a reducer coupling 5*b*. The reducer coupling 5*b* may have a conical or frustoconical portion and a cylindrical section. The set comprises a plurality of cones or reducer couplings 5*b* having different inner diameters and/or designs to fit with different designs and/or sizes of submarine power cables. For example, in the set, the cylindrical section of some of the reducer couplings 5*b* may have mutually different inner diameters, each being configured to fit with a submarine power cable of a certain size. Hereto, the set may for each size/design comprise two reducer couplings 5*b* having the same inner diameter and/or design for connection to a respective axial end of an inner watertight casing 5*a*. Each cone or reducer coupling 5*b* is configured to be attached to the inner watertight casing 5*a* in a watertight manner and to enable attaching a metallic water blocking layer of a core of a submarine power cable to the cone or reducer coupling 5*b* in a watertight manner. Each cone or reducer coupling 5*b* can be connected to one of the openings of the watertight inner casing 5*a*, for example by welding. The cones or reducer couplings 5*b* may be solder cones/reducer couplings for soldering the metallic water blocking layer to the cone or reducer coupling 5*b*.

The space between the electrical joint and the inner watertight casing 5a may be filled with sand when preparing a rigid sea joint from the adaptive rigid sea joint kit 1.

FIG. 1 only shows some of the components of a fibre optics joint kit 7, as it depicts a fibre optic joint made from components of the fibre optics joint kit 7.

The fibre optics joint kit 7 comprises two base components: a splice cassette 7a, and a compression cassette 7b configured to accommodate the splice cassette 7a. The splice cassette 7a is configured to hold spliced optical fibres of two fibre optic cables. The compression cassette 7b forms a watertight casing outside the splice cassette 7a.

The base components are configured to be used with a plurality of differently sized/and or designed fibre optic cables. The base components are thus universal components.

The compression cassette 7b has through-openings through which the two fibre optic cables to be spliced can be led into the compression cassette 7b.

The fibre optics joint kit 7 comprises two sets of adaptive components. The members of the two sets of adaptive components are configured to be used with specific types of and/or sized fibre optic cables. One of the sets of adaptive components comprises inner cable glands (not depicted) and outer cable glands 7c. The inner cable glands and the outer cable glands 7c provide sealing with different inner diameters and/or for different fibre optic cable designs. Each outer cable gland 7c is configured to be screwed into the through-opening of the compression cassette 7b from the outside. Each inner cable gland is configured to be screwed into the through-opening of the compression cassette 7b from the inside. The inner cable glands and outer cable glands 7c may have an inner sealing structure that is peelable. The sealing structure can be selectively peeled off in layers to fit a certain fibre optic cable diameter. Further, this set may additionally, or instead of the inner and outer cable glands, comprise a potting compound. The potting compound may be used for fibre optic cables of the largest diameters or if the fibre optic cables comprise an armour, to thereby ensure watertightness between the compression cassette 7b and the fibre optic cables.

Another set of adaptive components of the fibre optics joint kit 7 is an electrical connection kit. The electrical connection kit comprises clamps of different sizes configured to be connected to the metallic tube and/or armouring of a fibre optic cable to provide an electrical connection between the two fibre optic cables. The electrical connection kit also comprises cable lugs as an alternative to the aforementioned clamps in case aluminium armouring is present.

The electrical connection kit may comprise a busbar and/or an earthing wire to which the clamps and/or cable lugs may be connected for electrical connection between the clamps and/or cable lugs and thus between the fibre optic cables being jointed. Further, the electrical connection kit may comprise additional components allowing to electrically insulate or electrically connect the busbar or earthing wire(s) to the compression cassette 7b.

The rigid outer mechanical casing kit 9 comprises a first base component in the form of a rigid outer mechanical casing 9a. The rigid outer mechanical casing 9a is made of metal such as steel, e.g., stainless steel. The rigid outer mechanical casing 9a is configured to accommodate elements of the inner watertight casing kit 5 assembled to make a watertight cover around an electric joint of a core of a submarine power cable and one or more fibre optic joints 13 (shown in FIG. 2) assembled from the one or more fibre optics joint kits 7.

The rigid outer mechanical casing kit 9 may comprise one or more additional base component in the form of bend restrictors 15 (shown in FIG. 3) and/or bend stiffeners. The bend restrictors 15 or bend stiffeners are configured to be connected at respective axial ends of the rigid outer mechanical casing 9a. The bend restrictors 15 or bend stiffeners are in this case arranged around a respective submarine power cable section and restricts bending of these sections near the rigid outer mechanical casing 9a.

The rigid outer mechanical casing kit 9 comprises a first set of adaptive components in the form of armour fixation flanges 9b in different sizes and/or designs.

The armour fixation flanges 9b are configured to be connected to the rigid outer mechanical casing 9 and to armour of a submarine power cable. The armour fixation flanges 9b are welding flanges to which armour wires of the armour can be welded or clamping flanges which are configured to clamp the armour wires.

The rigid outer mechanical casing 9a has a respective through-opening at its axial ends configured to receive a respective submarine power cable. Each armour fixation flange 9b is configured to be mounted to the rigid outer mechanical casing 9a around one of the through-openings. The armour fixation flanges 9b may have different inner diameters to accommodate different submarine power cables with different outer diameters. When building a tailored rigid sea joint only two armour fixation flanges 9b are used, one for each through-opening. These are selected based on the size and/or design of the submarine power cables that are jointed.

The rigid outer mechanical casing kit 9 may comprise a second set of adaptive components in the form of subsets of elongated armour elements of different materials. These armour elements may be armour wires that can be twisted around a portion of a submarine power cable. As an alternative to the subset of elongated armour elements being pre-cut into suitable lengths, the subset may comprise a roll or drum of an elongated armour element, from which the elongated armour element may be unwound and cut into suitable lengths e.g., at the time a rigid sea joint is to be built. The armour elements may be welded to the armour fixation flanges 9b, after the armour fixation flanges have been mounted to the rigid outer mechanical casing 9a. The rigid outer mechanical casing kit 9 may also comprise a third set of adaptive components in the form of extra armour plates. Each extra armour plate, which may be annular, is configured to be arranged around the armour of a submarine power cable about 3-6 m away from an end of the rigid outer mechanical casing 9a. When the armour elements have been attached to an armour fixation flange 9b and arranged helically around an end section of a submarine power cable extending from the rigid outer mechanical casing 9b, the ends of the armour elements may be attached to the extra armour plate. In this way, the submarine power cables that are jointed will have a dual armour for a length corresponding to the extension of the armour elements as they extend in a twisted manner around the submarine power cable. The armour elements may for example provide a length of about 3-6 m of dual armour.

The rigid outer mechanical casing kit 9 may comprise a third set of adaptive components in the form of one or more rigid outer mechanical casing extension elements 9c. The rigid outer mechanical casing extension element(s) 9c can be used to extend the axial length of the rigid outer mechanical casing 9. This can create more space within the rigid outer mechanical casing 9 to work with when preparing jointing and/or for handling large stiff submarine power cables.

Moreover, the rigid outer mechanical casing extension element(s) 9c together with the exchangeable armour fixation flanges and optional second and third set of adaptive components, ensures that no part of the rigid sea joint needs to be re-designed for individual submarine power cables yet still a broad range of submarine power cables can be covered with a minimal number of adaptive components.

Figures 2, 3, 4:
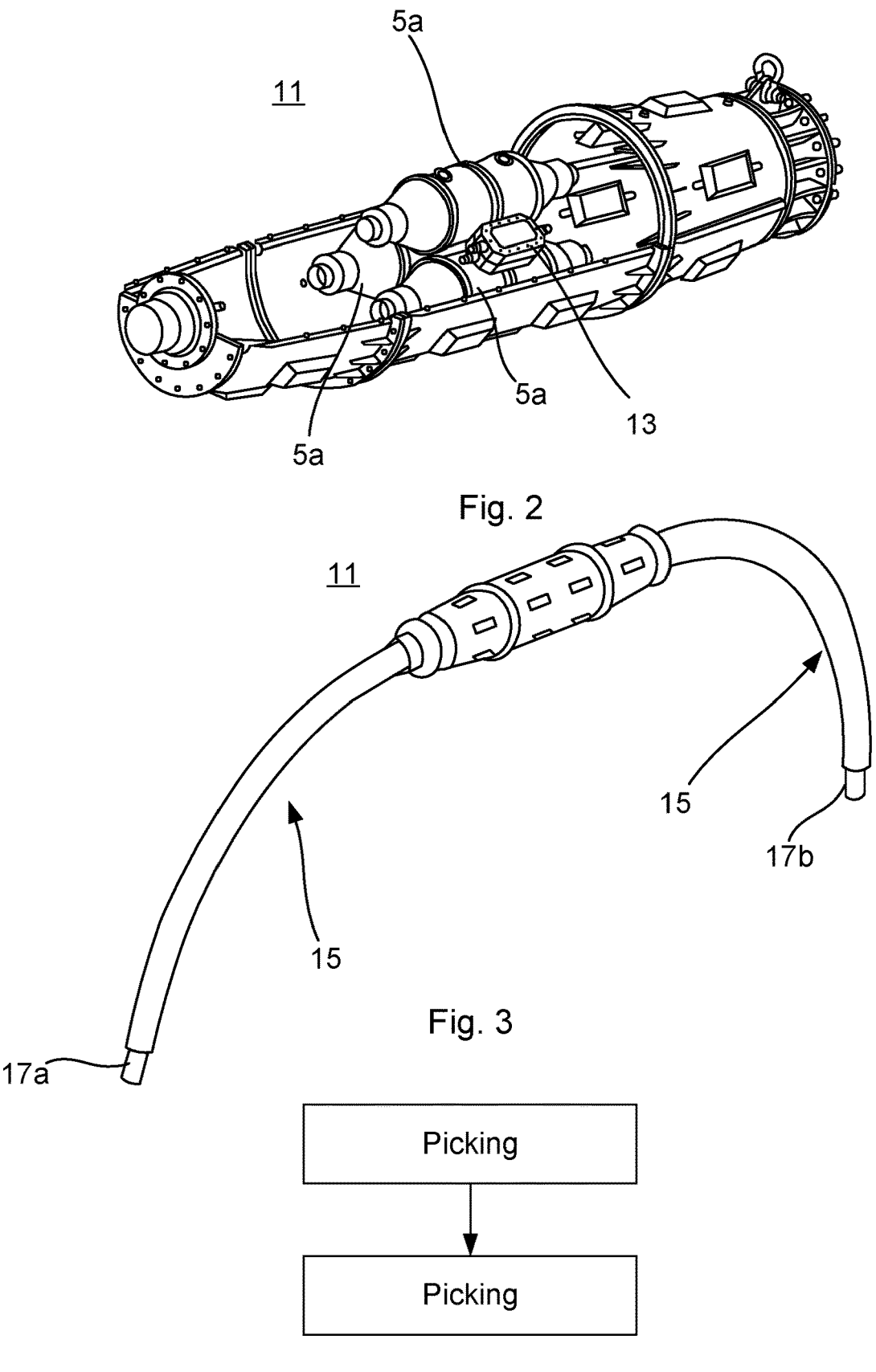
FIG. 2 is a perspective view of an example of a partially open rigid sea joint made from the adaptive rigid sea joint kit in FIG. 1.
FIG. 3 is a perspective view of an example of a tailored rigid sea joint made from an adaptive rigid sea joint kit.
FIG. 4 is a flowchart of a method of selecting components for one or more submarine power cables from the adaptive rigid sea joint kit.

FIG. 2 shows an example of a rigid sea joint 11 built from the kits 3, 5, 7, and 9 for jointing two three-phase submarine power cable.

FIG. 3 shows the rigid sea joint 11 with bend restrictors 15 attached at respective ends of the rigid outer mechanical casing 9a, around the two submarine power cables 17a and 17b that are jointed.

FIG. 4 shows a flowchart of a method of selecting components for one or more rigid sea joints 11 for jointing two submarine power cables 17a and 17b, from the adaptive rigid sea joint kit 1. Typically, the adaptive rigid sea joint kit 1 may be stored as off-the-shelf components in e.g., a warehouse of the manufacturer of the adaptive rigid sea joint kit 1. When components are to be selected for jointing two submarine power cables, at least one of each base component is picked from each of the kits 3, 5, 7, and 9. If the submarine power cables 17a and 17b have N cores, where N is greater than 1, at least N identical base components, i.e., at least one for each core, are picked from each kit 3 and 5. Further, adaptive components are picked from the sets of adaptive components from the kits 3, 5, 7, and 9 based on the designs and sizes of the two submarine power cables 17a and 17b for which the components are selected. In this way a tailored kit of components to build a tailored rigid sea joint to joint two submarine power cables can be selected.

For repairs, typically two tailored kits would be used as two tailored rigid sea joints will have to be made, i.e., at each end of a spare cable used for the jointing the two submarine power cables. In the example of a repair, in FIG. 3, one of the submarine power cables 17a and 17b would be a spare cable and the other one would be one end of the damaged submarine power cable that is in the process of being repaired. An additional tailored kit may be prepared as spare kit should the jointing operation be interrupted for example due to a shift in weather.

Tailored kits may be selected for two submarine power cables to be joined/repaired that are identical or different in design, or for more than two submarine power cables, with a plurality of different designs and/or sizes. The required number of base components and suitable adaptive components can be selected from one or more adaptive rigid sea joint kits 1.

The tailored kit(s) may be stored by the operator/owner of the submarine power cables or it may be shipped to site on demand in case of a repair or jointing during cable laying of a new submarine power cable.

The adaptive rigid sea joint kit 1 as well as the tailored kit may further comprise consumable materials such as tapes, and tools for making a rigid sea joint.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. An adaptive rigid sea joint kit for jointing submarine power cables, wherein the adaptive rigid sea joint kit comprises:

an inner watertight casing kit; and a rigid outer mechanical casing kit;

wherein each of the inner watertight casing kit and the rigid outer mechanical casing kit includes at least one base component, which can be fitted with a plurality of types and/or sizes of submarine power cables, and wherein each of the inner watertight casing kit and the rigid outer mechanical casing kit includes one set of an adaptive component or a plurality of sets of a respective adaptive component, each set of an adaptive component having a plurality of members of different designs and/or sizes of the adaptive component, enabling the at least one base component of the same kit to fit with different sizes and/or designs of submarine power cables, wherein the adaptive rigid sea joint kit thereby enables building part of one of any of a plurality of differently sized and/or designed rigid sea joints from the inner watertight casing kit and the rigid outer mechanical casing kit or jointing different types of submarine power cables falling within an applicability range of the adaptive rigid sea joint kit.

2. The adaptive rigid sea joint kit as claimed in claim 1, comprising an electrical joint kit, wherein the electrical joint kit includes at least one base component which can be fitted with a plurality of types and/or sizes of submarine power cables, and a plurality of sets of a respective adaptive component, each set of an adaptive component including a plurality of members of different designs and/or sizes of the adaptive component, enabling the at least one base component of the electrical joint kit to fit with different sizes and/or designs of submarine power cables, wherein the adaptive rigid sea joint kit thereby enables building one of any of the plurality of differently sized and/or designed rigid sea joints from the inner watertight casing kit, the rigid outer mechanical casing kit, and the electrical joint kit for jointing different types of submarine power cables falling within the applicability range of the adaptive rigid sea joint kit.

3. The adaptive rigid sea joint kit as claimed in claim 1, comprising an electrical joint kit, wherein the electrical joint kit includes a plurality of sets of a respective adaptive component, each set of an adaptive component having a plurality of members of different designs and/or sizes of the adaptive component, enabling members of the sets of the electrical joint kit to be assembled with each other to fit with different sizes and/or designs of submarine power cables, wherein the adaptive rigid sea joint kit thereby enables building one of any of a plurality of differently sized and/or designed rigid sea joints from the inner watertight casing kit, the rigid outer mechanical casing kit, and the electrical joint kit for jointing different types of submarine power cables falling within the applicability range of the adaptive rigid sea joint kit.

4. The adaptive rigid sea joint kit as claimed in claim 2, wherein the electrical joint kit comprises a base component in the form of a main joint sleeve.

5. The adaptive rigid sea joint kit as claimed in claim 2, wherein the electrical joint kit comprises four sets of adaptive components: a set of adapters of different inner diameters, a set of connectors of different sizes and/or design and/or materials, a set of fixing rings of different inner diameters and/or designs, and a set of contact sleeves of different sizes and/or designs.

6. Adaptive rigid sea joint kit as claimed in claim 5 dependent of claim 4, wherein each adapter is configured to be arranged inside the main joint sleeve, each connector is configured to connect two conductors of a respective core, one each from two submarine power cables, each fixing ring is configured to be attached to an adapter and to an insulation layer of a core of a submarine power cable, and each contact sleeve is configured to be arranged radially outside the connector, connected to two fixing rings.

7. The adaptive rigid sea joint kit as claimed in claim 1, wherein the inner watertight casing kit comprises a base component in the form of an inner watertight casing configured to accommodate components of an electrical joint kit assembled to make an electric joint of cores of two submarine power cables.

8. The adaptive rigid sea joint kit as claimed in claim 7, wherein the inner watertight casing kit comprises a set of an adaptive component in the form of cones reducer couplings of different inner diameters and/or designs, each cone reducer coupling having a conical or frustoconical portion being configured to be attached to the inner watertight casing in a watertight manner and to enable attaching a metallic water blocking layer of a core of a submarine power cable to the cone reducer coupling in a watertight manner.

9. The adaptive rigid sea joint kit as claimed in claim 8 wherein at least some of the cones are solder cones for soldering the metallic water blocking layer to the cone.

10. The adaptive rigid sea joint kit as claimed in claim 1, comprising a fibre optics joint kit, wherein the fibre optics joint kit includes at least one base component which can be fitted with a plurality of types and/or sizes of submarine power cables fibre optic cables, and a plurality of sets of a respective adaptive component, each set of an adaptive component including a plurality of members of different designs and/or sizes of the adaptive component, enabling the at least one base component of the fibre optics joint kit to fit with different sizes and/or designs of submarine power cables fibre optic cables, wherein the adaptive rigid sea joint kit thereby enables building part of one of any of the plurality of differently sized and/or designed rigid sea joints from the inner watertight casing kit, the rigid outer mechanical casing kit, and the fibre optics joint kit for jointing different types of submarine power cables falling within the applicability range of the adaptive rigid sea joint kit.

11. The adaptive rigid sea joint kit as claimed in claim 10, wherein the fibre optics joint kit comprises two base components: a splice cassette, and a compression cassette configured to accommodate the splice cassette.

12. The adaptive rigid sea joint kit as claimed in claim 11, wherein the fibre optics joint kit comprises two sets of adaptive components: 1) inner and outer cable glands providing sealing with different inner diameters and/or for different fibre optic cable designs, and/or a potting compound for providing sealing between the compression cassette and fibre optic cables with different diameters, 2) an electrical connection kit including clamps of different sizes configured to be connected to a metallic tube of a fibre optic cable for providing an electrical connection between metallic tubes of two fibre optic cables, and cable lugs configured to be connected to armour of a fibre optic cable for providing an electrical connection between the armour of two fibre optic cables.

13. The adaptive rigid sea joint kit as claimed in claim 1, wherein the rigid outer mechanical casing kit comprises a first base component in the form of a rigid outer mechanical casing configured to accommodate elements of the inner watertight casing kit assembled to make a watertight cover around an electric joint of a core of a submarine power cable.

14. The adaptive rigid sea joint kit as claimed in claim 13, wherein the rigid outer mechanical casing kit further comprises a second base component in the form of bend restrictors and/or bend stiffeners configured to be connected at axial ends of the rigid outer mechanical casing.

15. The adaptive rigid sea joint kit as claimed in claim 1, wherein the rigid outer mechanical casing kit comprises a first set of adaptive components in the form of armour fixation flanges in different sizes and/or designs, configured to be connected to the rigid outer mechanical casing and to armour of a submarine power cable.

16. The adaptive rigid sea joint kit as claimed in claim 15, wherein the armour fixation flanges are welding flanges or clamping flanges.

17. The adaptive rigid sea joint kit as claimed in claim 15, wherein the rigid outer mechanical casing kit comprises a second set of adaptive components in the form of subsets of elongated armour elements of different materials, and a third set of adaptive components in the form of extra armour plates, each extra armour plate being configured to be arranged around armour of a submarine power cable at an axial distance from an end of the rigid outer mechanical casing, for attaching the armour elements to the extra armour plate.

18. The adaptive rigid sea joint kit as claimed in claim 3, wherein the electrical joint kit comprises four sets of adaptive components: a set of adapters of different inner diameters, a set of connectors of different sizes and/or design and/or materials, a set of fixing rings of different inner diameters and/or designs, and a set of contact sleeves of different sizes and/or designs.

19. The adaptive rigid sea joint kit as claimed in claim 3, wherein the inner watertight casing kit comprises a base component in the form of an inner watertight casing configured to accommodate components of an electrical joint kit assembled to make an electric joint of cores of two submarine power cables.

20. A method of selecting components for a rigid sea joint for jointing two submarine power cables, using the adaptive rigid sea joint kit for jointing submarine power cables, wherein the adaptive rigid sea joint kit comprises:

an inner watertight casing kit, a rigid outer mechanical casing kit, wherein each of the inner watertight casing kit and the rigid outer mechanical casing kit includes at least one base component, which can be fitted with a plurality of types and/or sizes of submarine power cables, and wherein each of the inner watertight casing kit and the rigid outer mechanical casing kit includes one set of an adaptive component or a plurality of sets of a respective adaptive component, each set of an adaptive component including a plurality of members of different designs and/or sizes of the adaptive component, enabling the at least one base component of the same kit to fit with different sizes and/or designs of submarine power cables, wherein the adaptive rigid sea joint kit thereby enables building part of one of any of a plurality of differently sized and/or designed rigid sea joints from the inner watertight casing kit and the rigid outer mechanical casing kit for jointing different types of submarine power cables falling within an applicability range of the adaptive rigid sea joint kit, the method comprising: picking one of each type of base component of each kit, and picking adaptive components from the sets of adaptive components from each kit that fit the size and design of the two submarine power cables.

* * * * *